United States Patent [19]

Mayo et al.

[11] 4,299,202
[45] Nov. 10, 1981

[54] INTEGRATED SOLAR ROOF SYSTEM AND METHOD OF PRODUCING SAME

[75] Inventors: Alfred M. Mayo; Charles C. Convers, both of Dallas, Tex.

[73] Assignee: Pure Power Incorporated, Dallas, Tex.

[21] Appl. No.: 939,664

[22] Filed: Sep. 5, 1978

[51] Int. Cl.³ ............................................. F24J 3/02
[52] U.S. Cl. ..................................... 126/441; 126/445
[58] Field of Search ............... 126/441, 432, 450, 444, 126/445; 52/127, 309.8, 308, 397

[56] References Cited

U.S. PATENT DOCUMENTS

| | | | |
|---|---|---|---|
| 1,250,260 | 12/1917 | Wilcox. | |
| 3,145,707 | 8/1964 | Thomason. | |
| 3,561,425 | 2/1971 | Gardner et al.. | |
| 4,007,728 | 2/1977 | Guba | 126/445 |
| 4,062,350 | 12/1977 | Reed | 126/444 |
| 4,089,324 | 5/1978 | Tjaden | 126/445 |
| 4,111,186 | 9/1978 | Ross et al. | 165/168 |
| 4,116,222 | 9/1978 | Siefried | 165/168 |
| 4,117,828 | 10/1978 | Brownfield | 126/445 |
| 4,141,341 | 2/1979 | Eby | 126/444 |
| 4,178,912 | 12/1979 | Felter | 165/170 |

*Primary Examiner*—Stephen P. Garbe
*Attorney, Agent, or Firm*—Rogers, Eilers & Howell

[57] ABSTRACT

An integrated solar roof system, consisting of insulated roofing panels and collector panels, and method of producing same wherein the base assembly of the collector panel may be used with either an air or liquid absorber and is both an insulator and radiation shield as well as an integral structural part of the roof of the building on which it is mounted. The construction of the panels lends itself to mass production techniques and the efficient use of materials making the panels cost effective. The collector panels are also suitable for use as independently mounted units, functioning only as collectors and not as roofing members. Collector panels and insulated roofing panels, being identical in size and installation method, and said installation method being simple and quick, a suitable combination of panels may become a complete roof with minimal installation labor.

63 Claims, 30 Drawing Figures

INTEGRATED SOLAR ROOF SYSTEM AND METHOD OF PRODUCING SAME

BACKGROUND AND SUMMARY OF THE INVENTION

The present invention relates to solar roof systems and the method of producing same, and particularly to structural solar (energy collecting) roof panels. While solar panels in themselves have been known for many years, there has long been the need for a panel that is both economical to manufacture and to use. This points up the primary disadvantages of prior panels in that while some may have been efficient, the cost of that efficiency has been so high as to make them impractical. These high costs were the result of elaborate or complex designs, the use of expensive materials in the construction of the panel, the need for special support structure on the building to which the panels were to be mounted, or the inability to adapt the design of such panels to mass production techniques. Therefore, while the desirability of harnessing the sun's energy by use of solar panels has long been recognized, the ability to do so in a cost effective way has been a long existing problem.

Thus it is a primary object of this invention to provide a solar panel that is relatively inexpensive yet efficient, avoids the use of expensive materials, and is readily adaptable to large volume production. It is a further primary object of the invention to provide such a solar panel that is itself a structural part of the roof of the building to which it is mounted, replacing enough of the conventional construction materials to compensate for a significant part of the solar panel's cost. In other words, while it may be used solely as a collector, it is a feature of the panel of this invention that it may be an integral part of the roof structure system and is exceptionally easy to install.

It is a further primary object of the invention to provide panels which are generally the same in outward appearance and in the means for mounting as part of the roof structure, but which operationally are either air or liquid panels depending on the absorber used within the panel. Except for the differences in the absorber assemblies, the air and liquid panels are very nearly structurally the same, providing exceptional efficiency in their manufacture. Moreover, a purely structural roof panel with no absorber, but affording a high insulating value, is provided in accordance with this invention for compatibility with either the air or liquid panels using the same roof mounting technique and many of the same manufacturing techniques, again providing exceptional efficiency and low cost. This means that the manufacturing processes for producing the air panel, liquid panels, and structural panel greatly overlap so that the costs of manufacture of the three types of panels are relatively low. It also means that the air and structural panels, or liquid and structural panels, may be combined to provide a roofing system that can be installed quickly and easily, even as compared to conventional roofs without solar collecting capability, and yet is efficient in operation as a solar collector system and cost effective. Its ease and quickness of installation substantially reduce labor costs and contribute significantly to its cost effectiveness.

It is still a further object of the invention to provide air panels (or liquid panels) that are easily interconnected as part of a roof structure to provide a solar panel system that readily meets the individual needs of the customer. For example, the design of the air panel readily lends itself to several configurations of air inlets and outlets so that the panels can be interconnected in a variety of ways in accordance with the customer's capacity requirements.

It is still another object of the invention to provide solar panels of both the air and liquid type that are exceptionally reliable and trouble free over an extended period of use. The liquid panel is specifically designed to minimize any damage from corrosion or freezing or contamination of the liquid.

These and other objects of the invention are apparent from the drawing and detailed descriptions to follow.

DETAILED DESCRIPTION OF THE PREFERRED EMBODIMENTS

Figures 1, 14, 15, 16, 17:
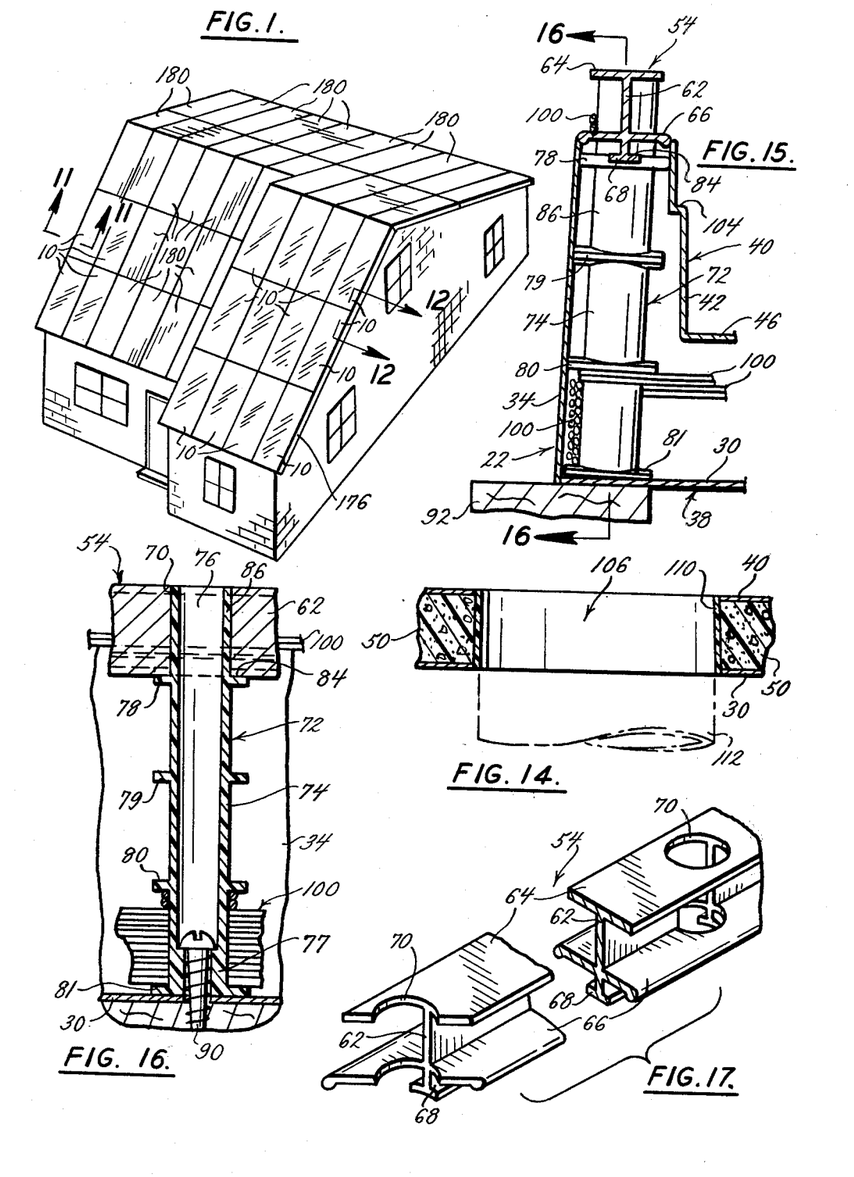
FIG. 1 is an isometric view of a building showing panels of the present invention as a structural solar roof system.
FIG. 14 is a view in section taken generally along the line 14—14 of FIG. 2.
FIG. 15 is a view in partial section of a portion of the base assembly for the air and liquid panels of this invention.
FIG. 16 is a view in section taken generally along the line 16—16 of FIG. 15.
FIG. 17 is a broken isometric view of the frame structure used with the air and liquid panels of this invention.

With reference to FIG. 1 of the drawing, there are shown generally by the reference 10 the solar panels of the present invention assembled to form the roof system. These may be either air panels, liquid panels, air and structural panels, or liquid and structural penals. FIG. 1 represents a typical installation of these panels as the roof of a building. The three types of panels, liquid, air and structural, to which the present invention relates, all have a similar outward appearance, are of the same external dimensions for purposes of installation, and are mounted on the roof and joined together in the same manner. While the invention is certainly not limited to panels of a particular dimension, the panels of the present invention have sufficient structural strength that they may be mounted on 36 inch (91.44 cm) centers so that the roof rafters may be at least 36 inches (91.44 cm) apart with a resultant savings in lumber and other construction costs over installation requiring closer spacings. For example, the panels of the present invention may be 36 inches (91.44 cm) wide by 96 inches (2.438 m) long and oriented with the width dimension horizontal as shown in FIG. 1. The number and type of panels used and the manner in which they are interconnected will depend on the customer's requirements, and it is one of the advantages of the present invention that the panels provide great versatility to meet those requirements.

As will be apparent, there is much similarity and even identity in structure between the various types of panels to which this invention relates, and particularly between the air and liquid panels. The similarity in structure and design is one feature that makes the panels cost effective through reduced manufacturing costs.

Air Collector Panel

Figures 2, 7, 8, 9:
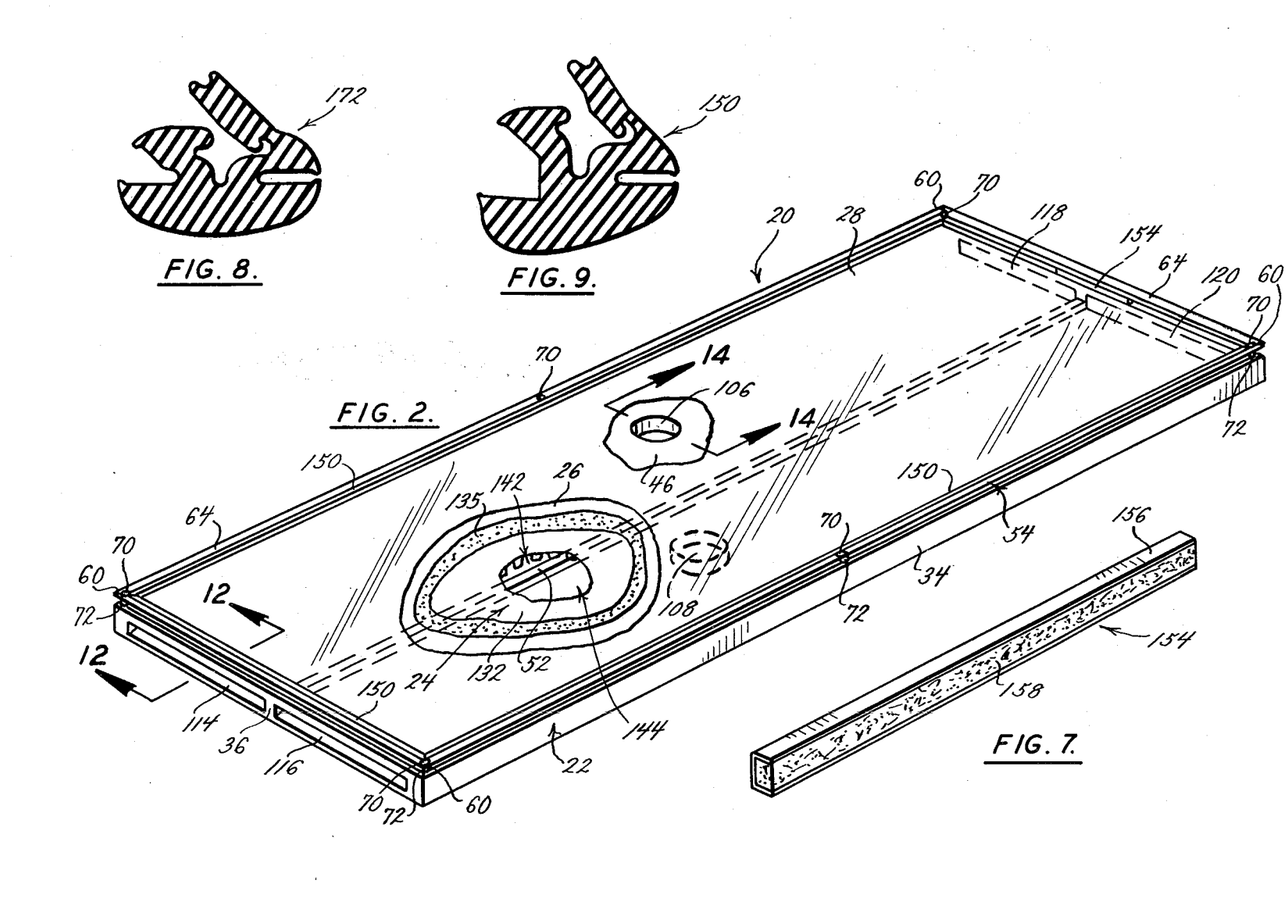
FIG. 2 is an isometric view with portions broken away of the air panel of the present invention.
FIG. 7 is an isometric view of the desiccant assembly used with the air panel of FIG. 2.
FIGS. 8 and 9 are cross sections of bead-closed type seals used for sealing the panel cover to the panel peripheral frame and also used between panels.
Figure 3:
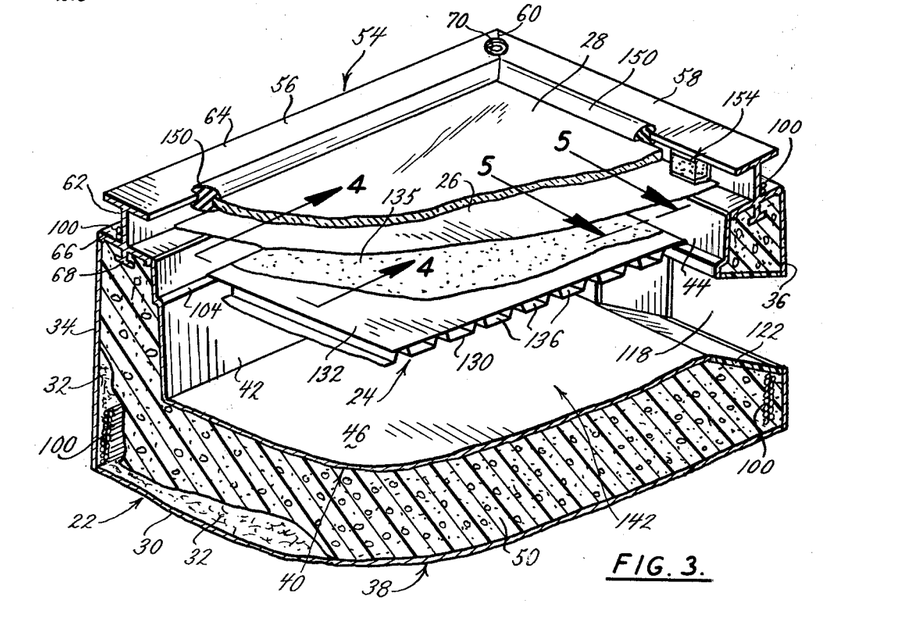
FIG. 3 is an enlarged broken corner section of the air panel of FIG. 2.

With reference to FIGS. 1 through 17 of the drawing, and generally FIGS. 2 and 3, the air panel 20 of the present invention generally comprises a base assembly 22, an absorber assembly 24 mounted within the base assembly, and convection barrier 26 located between the collector and a top cover 28. Each of thse components is of rectangular overall shape.

The base assembly 22 more specifically includes a rectangular bottom sheet 30 of aluminum or other high-strength reflective foil coated on the inside with plastic and glass fibers, or otherwise treated with a suitable surfactant to enhance adhesion and improve strength. For example, the sheet 30 may be approximately 0.0015 inches (0.038 mm) thick with a uniform spray coat of chopped fiberglass with polyester resin approximately 0.003 inches (0.076 mm) thick as shown at 32. The base assembly 22 also may have outer side walls 34 and 36 of aluminum foil coated inside with plastic and glass fibers as with the bottom sheet 30. Thus, the bottom sheet 30 and side walls 34 and 36 combine to form an outer pan assembly 38.

The base 22 also includes an inner pan or sheet assembly 40 which may also be of aluminum foil coated on the under side with plastic and glass fibers or other surfactant as with the bottom sheet 30. The inside pan 40 defines the inner side walls 42, end walls 44, and bottom 46 of the base assembly 22. Between the outer and inner foil pans 38 and 40, is a foam fill 50 which is cast in place in a mold with the other components of the base assembly as will be further explained, and may be single density or multiple density foam. For example, the foam around the outer edges of the base may be of a higher density than the foam in the central portion of the base although foam of uniform density throughout can also be used. The coatings 32 bond the foam fill to the outer and inner foil pans 38 and 40. A centrally located rib 52 extends the length of the base assembly.

At the upper peripheral edge of the base assembly 22 is a rectangular frame assembly 54 with side members 56 and end members 58 joined at the corners of the base assembly at miter joints 60. With particular reference to FIGS. 3 and 17, the frame 54 is preferably of extruded aluminum and has a vertical web 62 with horizontal webs 64, 66 and 68. The cross section of the frame 54 is as shown in FIGS. 3 and 17 with the lower horizontal web 68 firmly embedded in the foam 50.

The frame 54 has holes 70 which receive the upper ends of sleeves 72 (FIGS. 11, 13, 15 and 16). There are six holes 70 in each panel, one in each corner and one intermediate the ends of each side frame member. Therefore, there are six sleeves 72. Each sleeve has a cylindrical core 74 with an axial hole 76 therethrough, the hole being smaller in diameter at the bottom end 77 of the sleeve. A series of generally rectangular shaped webs 78, 79, 80 and 81 are spaced along the length of the core, these webs being embedded in the foam 50 so that the sleeves become an integral part of the base assembly. The upper web 78 has notches 84 that receive the lower web 68 of the frame 54. Thus, the upper portion 86 of each sleeve 72 extends through a hole 70 in the frame with the web 68 resting within the slots 84. Screws 90 extend through the smaller diameter holes 77 in the sleeves 72 (FIG. 11) and into the roof rafter 92 of the building to mount the panel on the roof or on a suitable framework if the panel is used external to the roof structure. A plug 94, such as of neoprene rubber, extends into the upper end of the sleeve to seal out moisture. The sleeve may be made of a glass-filled thermoplastic polyester such as polyterephthallate or some other suitable material.

To provide additional strength and further to support the components of the base structure during assembly, the base further includes roving 100 extending around the periphery of the base near the bottom and between the webs 80 and 81 of the sleeve 72. This roving also is wrapped between the intermediate sleeves at the sides of the panel so as to extend across the width of the panel midway between the ends also near the bottom. The number of wraps of roving is not critical but should be sufficient to provide reinforcing and strength to the base assembly. A couple of additional wraps of roving are provided around the periphery of the base near its top edge and just above the horizontal web 66 of the frame 54 for the purpose of holding the frame together during assembly. The roving may be of any suitable high strength material such as glass and polyester. The roving near the bottom of the base becomes embedded in the foam during the formation of the base assembly.

Thus, the base assembly 22 is an integral structure with its strength derived from the combination of the outer and inner foil pans 38 and 40, the foam 50 reinforced by the roving 100, the frame 54, and the sleeves 72. The foam 50 also acts as insulation with the outer and inner foil pans 38 and 40 providing multiple radiation shields in the operation of the solar panel. Moreover, the inner wall of the base assembly supports the absorber 24 on a peripheral ledge 104 formed in the inner wall of the base and spaced above the bottom inner wall 46 as will be further described, and the frame 54 provides means for mounting the barrier 26 and cover 28 and for joining adjacent panels as will be further described.

The base assembly 22, and therefore the air panel 20, has several configurations depending on how the panels are connected in the system. The differences in these configurations are in the air inlets and outlets. The panel is shown in FIG. 2 with all of the inlets and outlets and will be used to explain some of the various configurations.

As shown in FIG. 2, the panel has openings 106 and 108 through the bottom of the base on opposite sides of the longitudinal rib 52. These openings are offset for convenience in connecting to the building's forced air system, and are formed during the casting of the base and are lined with sleeves 110 (FIG. 14) of any suitable material such as fiberglass wrap saturated with polyester resin. The sleeves 110 taper to a smaller diameter near the top and receive a suitable air duct 112 which is part of the forced air system. The panel of FIG. 2 also has generally rectangular openings 114 and 116 extending through one end of the base, and openings 118 and 120 extending through the opposite end of the base. These openings are also formed during the casting of the base and are lined with sleeves 122 (FIGS. 3 and 12) shaped generally as shown. The sleeves 122 are also formed of any suitable material such as a fiberglass wrap saturated with polyester resin. The sleeves 110 and 122 may be lined at their inner walls with a thin foil such as of aluminum.

One configuration of the air panel 20 is with all of the openings as shown in FIG. 2. With this configuration one of the openings 106 or 108 acts as an air inlet and the other an outlet. Assuming the opening 106 is the inlet, the openings 114 and 118 distribute air to adjacent air panels of a different configuration to be described, and the openings 116 and 120 receive return air from the adjacent panels which exists at the outlet 108.

In another configuration of the air panel 20, only the openings 114 and 116, or 118 and 120, are present. This configuration is used as an adjacent panel at one or both ends of the panel of the configuration in FIG. 2. When used in this manner, and assuming the opening 106 is the inlet and the opening 108 is the outlet, air entering the inlet 106 passes through the openings 114 and 118 to the adjacent panels of the second configuration. It passes through the absorbers of the adjacent panels and back through the openings 116 and 120 and through the outlet 108. Air also passes through the absorber of the panel of the configuration in FIG. 2 and through the outlet 108.

A third configuration of the air panel 20 includes only the openings 106 and 108 and is designed for use without adjacent panels. In this configuration air entering the inlet 106 passes through the absorber and then through the outlet 108.

Thus, with the various configurations of the air panel 20, the panel may be used with or without adjacent end panels to meet the customer's requirements. Other configurations are also possible.

With particular reference to FIGS. 3 through 6 and 11 and 12, the absorber assembly 24 includes a lower corrugated sheet 130 and an upper flat sheet 132 bonded all along the tops of the corrugations of the lower sheet. Any suitable bonding agent may be used such as an epoxy or other adhesive or even a welding process. The edges of the top sheet 132 are folded back for stiffness as at 134 around the periphery of the absorber assembly and are secured to the ledge 104 at the inner wall of the base assembly 22 with a suitable adhesive. The sheets 130 and 132 are preferably of aluminum and are of relatively thin gauge, such as for example approximately 0.005 inches (0.0127 mm), and the upper surface of the upper sheet 132 is coated with a light-absorptive material 135, preferably selective, such as the black chrome coating licensed by NASA, to provide the heat absorbing surface for the collector.

Figure 4:
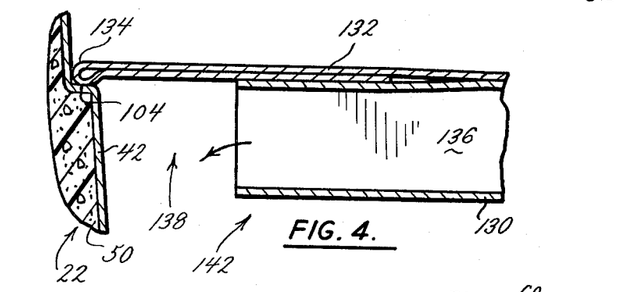
FIG. 4 is an enlarged view in section taken generally along the lines 4—4 of FIG. 3.
Figure 5:
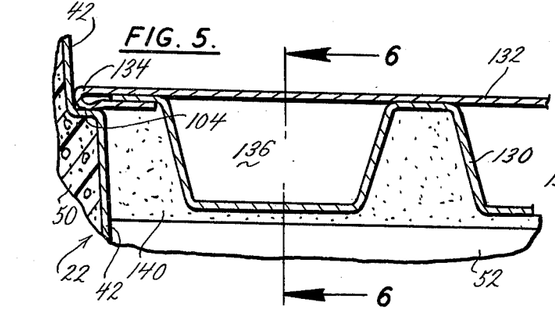
FIG. 5 is an enlarged view in section taken generally along the lines 5—5 of FIG. 3.
Figure 6:
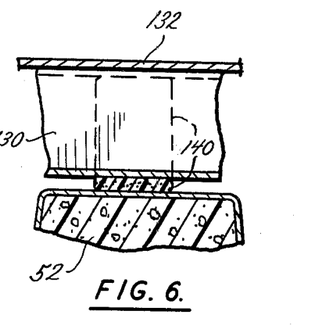
FIG. 6 is a view in section taken generally along the lines 6—6 of FIG. 5.
Figure 10:
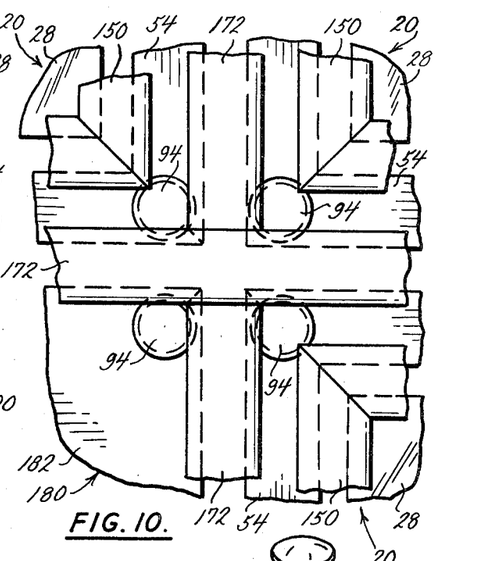
FIG. 10 is a partial plan view showing the intersection of four panels as mounted on the roof of a building.

The sheets 130 and 132 define air passages 136 therebetween extending the width of the panel. As best shown in FIG. 4, the lower sheet 130 is narrower than the upper sheet 132 so that its side edges are spaced from the side walls of the base assembly 22 as shown at 138 to allow the air to pass between the ends of the passages 136 and the side walls of the base. The absorber 24 also rests on top of the rib 52 and is sealed to the rib by an appropriate sealing compound 140 (FIG. 6) to prevent the flow of air from one side of the rib to the other except through the air passages 136. In other words, the sealing compound prevents the passage of air between the rib and the lower absorber sheet 130. The sealing compound may be of any suitable type such as a silicone rubber compound. An example is General Electric RTV 1200. Thus, the seal between the rib 52 and the collector 24 defines two plenum chambers 142 and 144, one for the air inlet and one for the air outlet. For example, air entering the opening 106 would pass into the plenum chamber 142 through the air passages 136 of the absorber 24, into the plenum chamber 144, and through the opening 108, with the air absorbing heat as it moves through the absorber assembly.

Spaced above the absorber 24 is the convection barrier sheet 26 which may be of a relatively thin polyester or other clear plastic film, which may be reinforced with a fiberglass mesh and resin such as approximately 0.010 inches (0.25 mm), and which is secured to the web 66 of the frame 54 with a suitable bonding agent. An example of such a film is LLUMAR from Martin Processing, Inc. The purpose of the film is to act as a convection barrier and structural reinforcement. Both the absorber 24 and convection barrier 26 are notched at the corners (not shown) to allow for changes in atmospheric pressure. Both surfaces of the barrier 26 may be etched, pebbled or otherwise "de-glossed" to reduce reflection.

Spaced above the convection barrier 26 is the cover 28 which in this preferred embodiment is of glass although a suitable plastic could also be used. The cover is secured to the top web 64 of the frame 54 around its periphery by a bead-closed seal 150 of a cross section shown in FIG. 9. This seal need not be described in detail as it is a well known item commonly used in the automotive industry. The cover 28 must transmit light efficiently and must act to protect the panel against the weather. In this preferred embodiment the glass cover is pebbled or grained on both sides to allow for the collection of light at varying sun angles and may be approximately 5/32 inch (4 mm) thick. An example of a suitable glass cover is a product called SUNADEX by ASG Corporation.

Between the convection barrier 26 and cover 28 is a desiccant assembly 154 (FIGS. 3 and 7) with a generally C shaped frame 156 with the desiccent material 158 therein. The desiccant 158 is held within the frame 156 and the entire desiccant assembly is held between the webs 64 and 66 of the frame 150 by a suitable adhesive. The purpose of the desiccant assembly is to absorb moisture that might collect within the panel. When hot, the desiccant is dried and reactivated.

Figure 11:
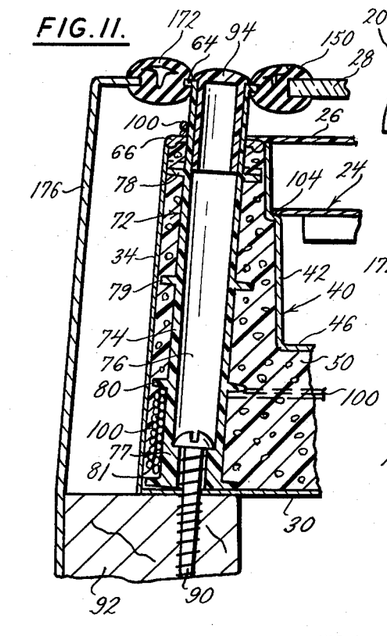
FIG. 11 is an enlarged view in section taken generally along the line 11—11 of FIG. 1 and taken through the middle side mounting sleeve and showing a typical fit between the panel and the roof edge flashing.

With reference to FIGS. 1, 10, 11 and 12, there is shown the manner in which the air panel is mounted to the roof and joined to an adjacent air panel. The sides of the panel are tapered as readily seen in FIG. 12, and the sleeves 72 are canted. As previously explained, the panel is mounted to the roof joists 92 by the screws 90. To properly position adjacent panels, the bottom edges of the panels are butted as at 170, which leaves sufficient space between the frames 54 of adjoining panels for bead-closed seal 172 which acts as a seal between the webs 64 of the adjacent frames. The cross section of the bead-closed seal 172 is shown in FIG. 8 but need not be described in detail as it is a standard item commonly used in the automotive industry. Where the ends of adjoining panels have the openings 114, 116, or 118 and 120, a suitable gasket 174, such as of a closed pore resilient sponge like material, is placed between the adjoining ends. A seal, such as the seal 172 is also used between the panel and the roof edge flashing 176 as shown in FIG. 11.

Fabrication and Assembly of The Air Panel

To fabricate the air panel 20, the base assembly 22 and absorber 24 are fabricated separately and then assembled. Fabrication of the base assembly 22 begins with the outer and inner pans 38 and 40. The inner pan is one piece and is formed from a single sheet of foil pressed into shape between male and female forms. The underside of the pan 40 is then sprayed with the plastic and glass fibers unless some other suitable structural surfactant treatment has been previously applied. The outer pan 38 is of two or more pieces, a bottom sheet and the side sheet or sheets, the latter of which are part of the frame assembly to be described. The holes 106, 108, 114, 116, 118 and 120 are punched in the bottom and side sheets as required. Next the inside surfaces of the bottom and side sheets of the outer pan 38 are sprayed with the plastic and glass fibers unless some other suitable structural surfactant treatment has been previously applied. Once sprayed, or otherwise treated, the inner and outer foil pan components become considerably stiffer and can be handled without damage.

The frame 54, sleeves 72, roving 100, and foil sides 34 and 36 are assembled as a separate operation. A suitable fixture is provided with pins for properly locating the sleeves 72. There are six such pins and the sleeves fit over the pins upside down. Next the extruded frame 54, which is precut and drilled, is placed on the sleeves, the sleeves fitting into the pre-drilled holes of the frame, and the roving 100 covered with polyester is then wrapped around the sleeves both at the bottom and top in the manner previously described. A couple of wraps are made to hold the frame 54 together, and more wraps are made at the free ends of the sleeves. These extend all the way around the periphery of the panel. Several wraps are also made between the sleeves located midway of the length of the panel. The outer foil sides 34 and 36 are put in place against the frame 54, sleeves 72, and outer roving 100 to form the sides of the base assembly. The polyester is then allowed to cure, and once cured, the frame 54, sleeves 72, roving 100 and foil sides become a fairly rigid structure that can be removed from the pins without distortion.

To complete the formation of the base assembly 22, a suitable casting mold is used. The base is cast upside down with the inner pan 40 placed upside down on the lower platen of the mold so that the spray coated side is up. Next the assembly including the frame 54, sleeves 72, foil sides, and roving 100 that was previously cured, is placed upside down in the mold and in proper position with respect to the inner pan 40. The bottom of the outer pan 38 is held by the upper platen of the mold, such as by vacuum or the like, with the spray coated side of the bottom sheet facing down.

With the bottom and top halves of the mold separated, and with the various components of the base assembly in place, foam resin is then discharged uniformly around the perimeter of the mold cavity and along the center portions of the cavity including the central rib 52. After the requisite amount of foam resin has been discharged into the cavity, the mold halves are brought together and clamped for a sufficient time to allow full expansion of the foam in the mold cavity and sufficient hardening of the resin to become dimensionally stable. The base assembly may then be removed from the mold and allowed to complete the curing process.

Upon full expansion, the foam completely embeds all of the base components below the web 66. This includes the web 68 of the frame 54, all but the upper portions of the sleeves 72, and the roving 100 at the lower ends of the sleeves. The mold is suitably designed to provide a seal between the upper edges of the pans 38 and 40 and the outer and inner edges of the web 66 of the frame 54 so as to contain the foam during expansion to the locations below the web 66. The sleeves 110 and 122 are inserted in the mold and suitable plugs are used as required for the openings 106, 108, 114, 116, 118 and 120 for the various air panel configurations.

The absorber assembly 24 is fabricated by a separate operation from the base assembly. The top sheet 132 is coated with the light-absorptive material, such as the black chrome coating, by processes that need not be described as they are known and readily available in the art. The lower corrugated sheet 130 is also formed by well known methods such as by feeding a flat aluminum sheet through a rotating die to form the corrugations. Obviously the sheet may be either precut or cut to length after the corrugations are formed. Next the uncoated side of the upper sheet 132 is bonded to the lower corrugated sheet 130 by use of a suitable bonding agent or process as previously described, thus creating the air passages 136 therebetween.

It has been found that because the sheets 130 and 132 are relatively thin that the lower sheet should be suitably supported on a table having ridges corresponding to the corrugations when the upper sheet is bonded thereto. This prevents the corrugations from becoming flattened or distorted during the bonding process.

After fabrication of the subassemblies 22 and 24, the two are assembled together. First the seal compound 140 is placed along the upper surface of the rib 52 in sufficient quantity to fill not only between the rib and the bottom of the corrugations but also between the corrugations at the location of the rib so as to completely seal one plenum chamber from the other. A suitable bonding agent is also placed on the ledge 104 around the inner wall of the base assembly. The absorber assembly 24 is then placed on the ledge 104 and rib 52 with the absorptive surface facing upwardly. Next the convection barrier 26 is secured around its periphery to the web 66 of the frame 54 by suitable tape or liquid adhesive and the desiccant assembly 154 is positioned at some location within the panel between the webs 64 and 66. The cover 28 is then mounted in place by means of the bead-closed seal 150 to complete the air panel assembly.

Installation and Operation of the Air Panel

Figure 12:
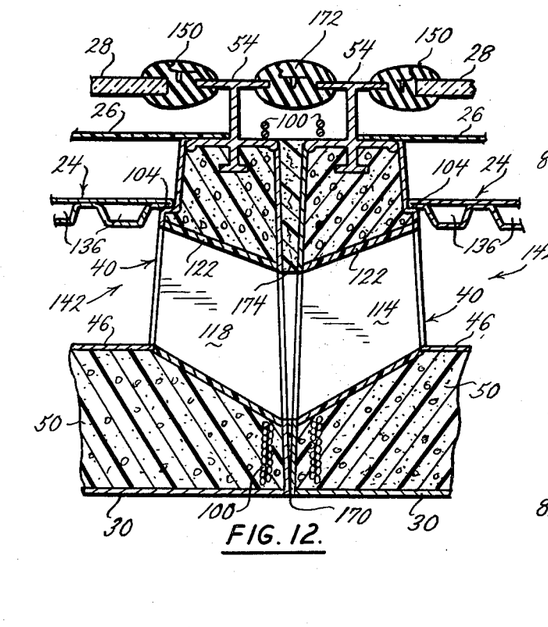
FIG. 12 is an enlarged view in section taken generally along the line 12—12 of FIG. 1, and the right portion of which also represents a sectional view taken along the line 12—12 of FIG. 2 showing one configuration of the air panel and the end joint between adjacent air panels of that configuration.
Figure 13:
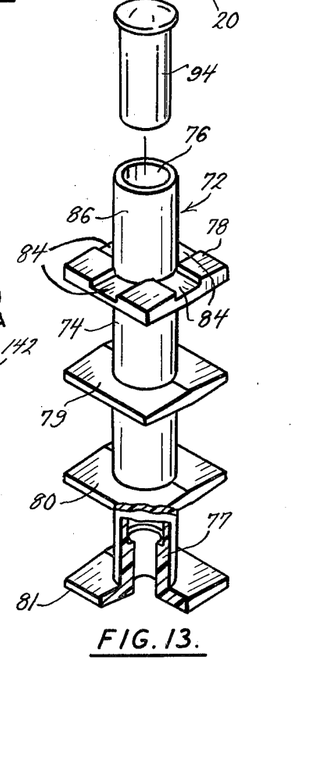
FIG. 13 is an isometric view of a mounting sleeve and plug assembly used in the panels of this invention.

Installing the panels on the roof is an extremely easy operation. The panels are simply placed as shown in FIG. 1 with the holes over the roof rafters and held in place with six screws. Adjacent panels are butted as shown in FIG. 12 and sealed with the bead-closed seal 172. The gasket 174 between the ends of adjoining panels is used where appropriate and the forced air system of the building is then connected to appropriate inlets and outlets of the panels. The openings 106, 108, 114, 116, 118 and 120 provide ease in adapting to the air ducts of the forced air system.

Heat energy from the sun light that passes through the cover 28 and barrier 26 is absorbed by the high efficiency absorptive upper surface of the absorber assembly 24 and transferred to the air moving through the air passages 136 in the absorber. The barrier 26 helps prevent convection loss and thus increases the efficiency of the panel. As previously explained, depending on the configuration of the air panel used, air enters one of the plenum chambers 142 or 144, moves into the passages 136 at one side of the panel, moves through the passages and then out the ends of the passages at the other side of the panel and into the other plenum chamber. The manner in which the air enters and leaves the plenum chambers depends on the configuration of the air panel, i.e., which of the openings 106, 108, 114, 116, 118 or 120 is used.

The base assembly 22 acts as an insulator and radiation shield for increased efficiency with the foam 50 acting primarily as the insulator and the foil pans 38 and 40 and lower surface of the absorber 24 serving as multiple radiation shields. Not only does the base act as an insulator and shield, but also as an integral structural portion of the roof of which the panel is a part. This structural support is achieved through the cooperation of the various elements of the base including the foam 50, the outer and inner foil pans 38 and 40, the extruded frame 54, the sleeves 72, and the roving 100. The roving not only reinforces the foam base, giving it dimensional stability, but it also supports the subassembly of the frame 54, sleeves 72, and foil sides during fabrication of the panel. The frame 54, because of its rigidity, adds significantly to the load carrying capabilities of the panel and also provides the means by which the cover 28 is mounted and adjacent panels are joined. The pans 38 and 40, although foils, also add significantly to the load carrying capability of the panel as they act in tension and compression under load. Thus, all of the base components cooperate and act together to achieve the superior structural stability, load carrying capacity, and high efficiency.

Structural Roof Panel

With reference to FIGS. 18 through 21, the structural roof panel of this invention will be described. Because this panel has no heat transfer function as with the air and liquid panels, its structure is simplified over the structures of the other panels. Its purpose is to serve as a structural roof member and insulator in conjunction with either or both of the other panels and further to give the roof a uniform appearance. In spite of the simpler structure, there are many similarities in design between this panel and the others and therefore it will be described with reference to the air panel for simplicity.

Figure 18:
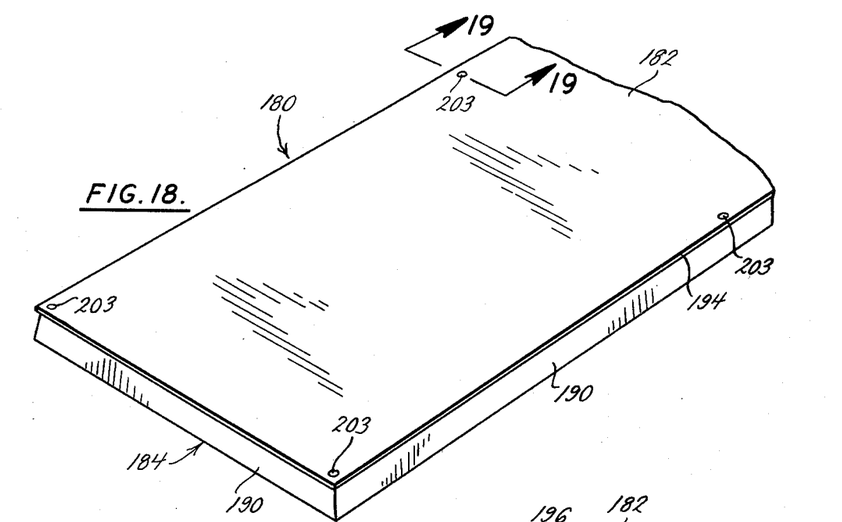
FIG. 18 is a partial isometric view of a structure panel of this invention.
Figures 19, 20, 21:
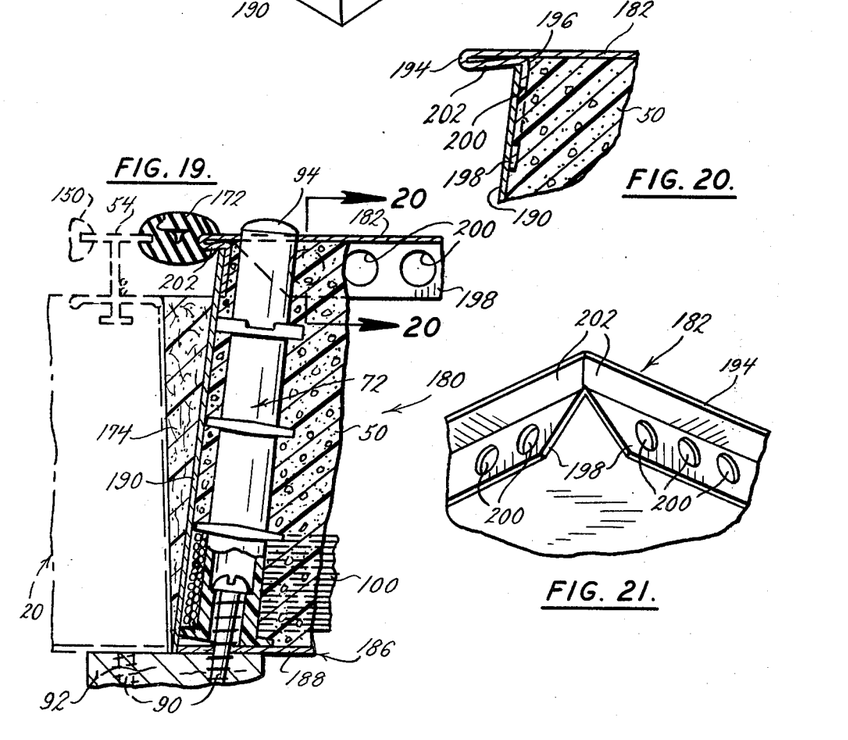
FIG. 19 is an enlarged view in section taken generally along the line 19—19 of FIG. 18.
FIG. 20 is an enlarged view in section taken generally along the line 20—20 of FIG. 19.
FIG. 21 is an isometric view looking at the corner of the cover of the structural panel of FIG. 18.
Figure 22:
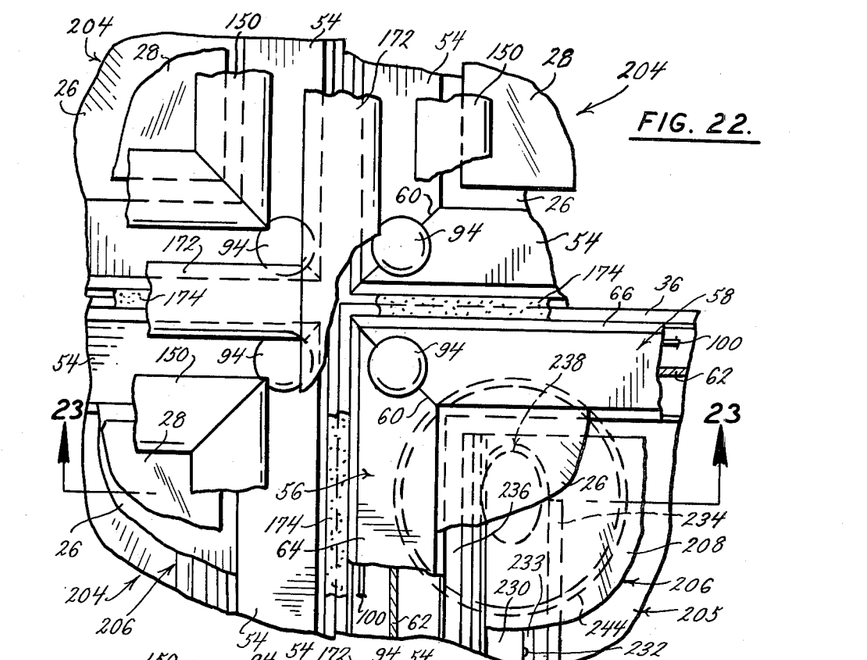
FIG. 22 is a plan view with portions broken away showing the juncture of four liquid panels of the present invention.
Figure 23:
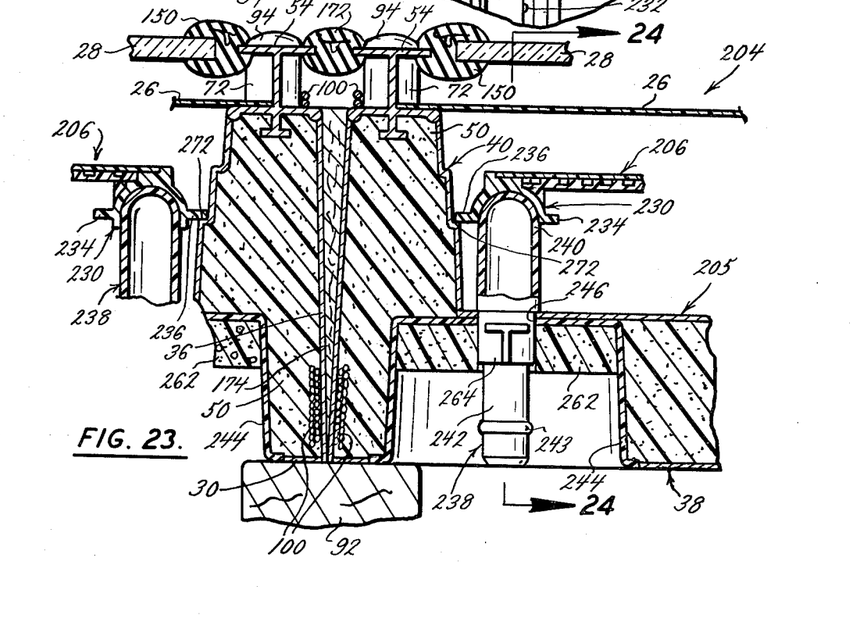
FIG. 23 is the view in section taken generally along the line 23—23 of FIG. 22.

The structural panel 180 is much like the air panel 20 but without the absorber, convection barrier, glass cover, and extruded frame. It can be thought of generally as the base assembly 22 of the air panel with some modifications, but with the extruded frame replaced by a metal cover which also replaces the glass cover of the air panel. The result is a substantial saving in cost. The structural panel 180 includes a top cover 182 and base assembly 184 formed integral therewith. The base assembly 184 includes an outer foil pan 186 having a bottom sheet 188 and sides 190. The outer pan 186 is very similar to the outer pan 38 of the air panel. The base 184 also includes the sleeves 72, roving 100, and foam 50 as with the air panel, which components are cast in a mold in a manner substantially similar to that described with respect to the air panel. The sides of the structural panel 180 are tapered and the sleeves 72 are canted as with the air panel.

The top cover 182 may be of aluminum, coated on the top surface with an appropriate protective coating such as TEDLAR, and on the bottom surface with a spray coat of plastic and glass fiber, or otherwise treated as previously discussed, as with the outer and inner pans 38 and 40 of the air panel. The purpose of the inner coating or structural surfactant treatment is to bond the foam to the cover 182 and increase strength. The peripheral edges of the cover are folded back at 194 and then down at 196 to provide a peripheral flange 198. Spaced all around the flange 198 are holes 200 therein which receive the foam 50 during the molding process and thereby act to hold the cover 182 firmly in place after the foam has cured. The upper edge of the foil sides 190 overlie the flange 198.

It will be further noted that where the cover 182 folds at 194, there is formed another flange 202 which provides the same function as the web 64 of the air panel to receive the bead-closed seal 172 between adjacent panels. The cover 182 has holes 203 and the structural panel 180 is mounted to the roof in exactly the same manner as the air panel by the use of screws 90, except of course there are no air duct connections to make.

Fabrication of the Structural Panel

The fabrication of the structural panel 180 is very similar to that of the base assembly 22 of the air panel. Thus, the cover 182 takes the place of the extruded frame 54 with the upper ends of the sleeves 72 extending through the holes 203 in the cover sheet. The cover sheet 182, sleeves 72, roving 100, and foil sides 190 are assembled in much the same way as the frame 54, sleeves 72, roving 100, and foil sides of the air panel. This assembly is then placed upside down in a mold with the bottom foil 188 held by the upper mold half. With the mold halves apart, foam resin is discharged into the mold cavity, the mold halves are brought together, and the foam is allowed to expand and cure until it is dimensionally stable. As the foam expands it completely fills the entire panel bounded by the foil pan 186 and cover 182.

The structural panel 180 performs not only the necessary structural function but also acts as an insulation barrier and radiation shield for the building.

Liquid Collector Panel

Except for minor variations which will be noted, the structure of the liquid panel is the same as that of the air panel except for the absorber assembly.

With reference to FIGS. 22 through 30, the liquid panel 204 has a base assembly 205 identical to the base assembly 22 of the air panel except that in the place of the air inlets and outlets 106, 108, 114, 116, 118 and 120, liquid outlets are provided as will be described. Otherwise the base assembly 205 has all of the same components as the base assembly 22 including the outer and inner foil pans 38 and 40, the extruded frame 54, the sleeves 72 and the roving 100. The base assembly 205 is assembled and fabricated using the same process as with the base assembly 22.

In place of the absorber 24 of the air panel, the liquid panel has an absorber assembly 206 for the use of liquid instead of air located between the bottom portion of the base assembly and the convection barrier 26. The cover 28 is located above the convection barrier as with the air panel. The convection barrier 26 and cover 28 are identical to those used with the air panel and are mounted to the base in the same way. The essential difference lies in the absorber assembly 206 which will now be described.

The absorber assembly 206 includes a top sheet 208 such as of aluminum which is flat and coated on its upper surface with a light-absorptive finish as with the absorber 24 of the air panel. The absorptive finish is represented by the numeral 210 in FIG. 30. The lower surface of the sheet 208 is coated with an epoxy or other suitable non-metallic coating so that the liquid that flows within the absorber never comes in contact with the top sheet 208. The non-metallic coating is shown by the numeral 212 in FIG. 30.

Figures 27, 28:
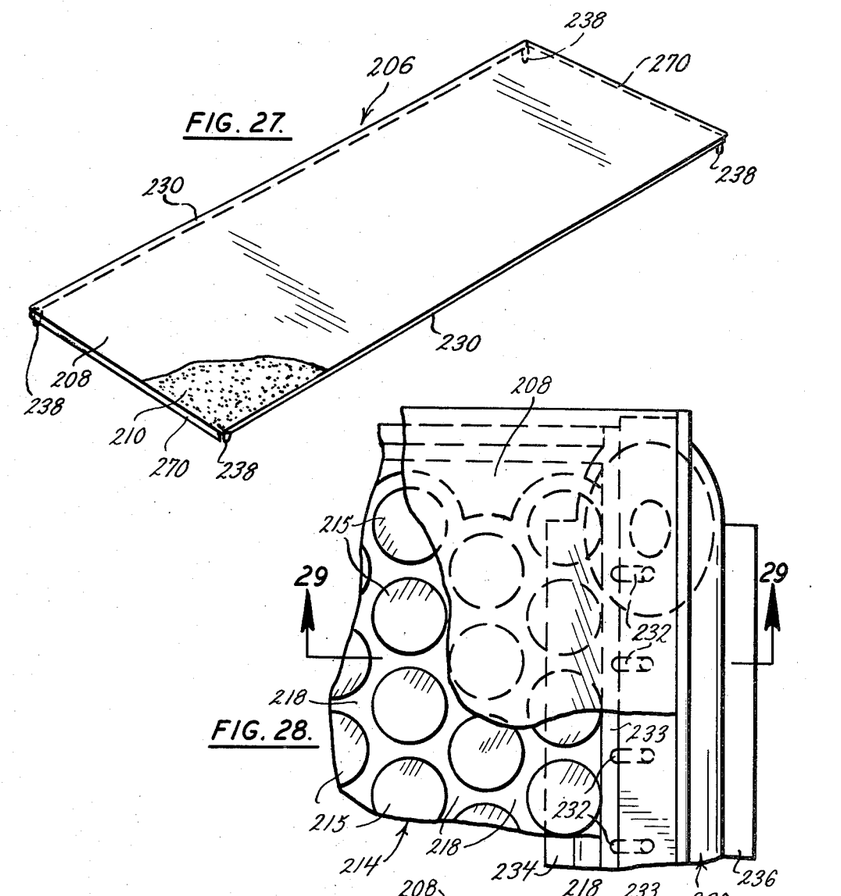
FIG. 27 is an isometric view of the absorber assembly of the liquid panel of this invention.
FIG. 28 is a partial top plan view with portions broken away of the corner of the absorber assembly of FIG. 27.
Figures 29, 30:
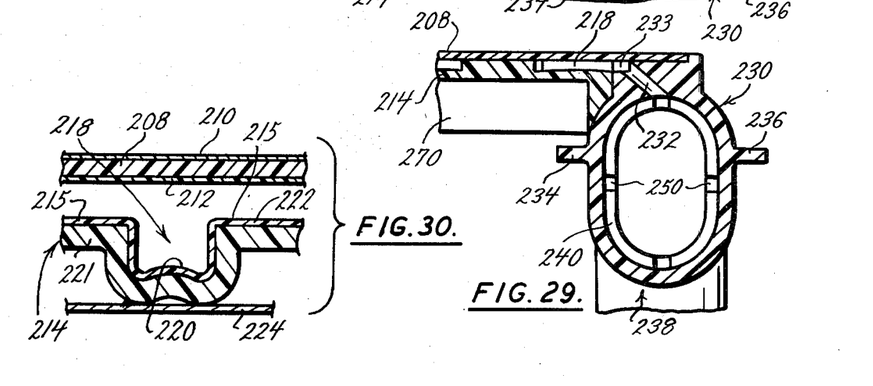
FIG. 29 is a view in section taken generally along the line 29—29 of FIG. 28.
FIG. 30 is a partial exploded sectional view of the absorber assembly of FIG. 27 taken through one of the liquid passages and showing the top and bottom sheets separately.

The absorber 206 also includes a bottom sheet 214 having a series of generally round buttons or bumps 215 oriented as shown in FIG. 28 and defining channels 218 therebetween. Thus, it can be seen that the buttons are positioned equidistant apart and in rows and alternately offset to create precisely regulated circuitous channels for the flow of the liquid. The bottoms of the channels are convoluted as shown at 220 such that the lower sheet 214 at the locations of the channels 218 acts somewhat like a diaphragm in the event of freezing of the liquid to minimize damage to the absorber. By way of example, the absorber 206 may have approximately 24,000 buttons spaced over the surface of the lower sheet. Further by way of example, the buttons may be approximately 0.285 inches (7.24 mm) in diameter and the channels approximately 0.090 inches (2.29 mm) wide and 0.045 inches (1.14 mm) deep at the center.

With reference to FIG. 28, it will be noted that the paths of the liquid through the channels are more circuitous, moving from one side of the absorber assembly to the other, than they would be in moving from one end of the absorber assembly to the other. This means that if the pattern of the buttons were oriented at 90° to that shown in FIG. 28, the pressure drop of the liquid moving across the width of the absorber assembly would be less than with the pattern oriented as shown. With the above relative dimensions and the configuration and pattern shown, the pressure drop across a 48 inch (121.9 cm) panel, if the pattern is turned 90°, is substantially the same as the pressure drop across the 36 inch (91.4 cm) panel with a pattern oriented as shown in FIG. 28. Thus, the pattern of FIG. 28 can also be used with a 48 inch (121.9 cm) panel and the same pressure drop can be achieved by rotating the pattern 90° so that the liquid follows the less circuitous paths.

The main portion 221 of the bottom sheet may be of chopped fiberglass and polyester with a top surface having a gel coating 222, such as of an epoxy, to provide a liquid impervious surface. The bottom surface is covered with a foil 224, such as of aluminum to provide strength and a radiation shield. As an alternative, an epoxy could be used for both the gel coating 222 and as the binder resin of the main portion 221 of the lower sheet 214 in place of the polyester. Likewise, any other suitable non-metallic structural material may be used for either or both the gel coat or main portion.

The upper sheet 208 is bonded to the top surfaces of the buttons 215 of the lower sheet 214 with a suitable bonding agent such as an epoxy. The bonding agent must be able to withstand the water pressures and temperatures appropriate to the system. The entire upper surfaces of the buttons 215 are bonded to the upper sheet 208 so that the liquid flows only in the channels 218 and not between the buttons and the top sheet.

Along each side edge of the absorber 206 is a manifold 230 which is generally oval in cross section (FIGS. 23 and 29) and which has holes 232 spaced along its length and communicating with a longitudinal channel 233 which in turn communicates with the channels 218 between the buttons 215 adjacent the manifolds. Preferably there is a hole 232 in approximate alignment with each channel 218 between the buttons 215 adjacent the manifolds along the entire length of the absorber. One manifold is an inlet manifold and the other an outlet manifold.

The manifolds 230 have inner and outer flanges 234 and 236 and have connectors 238 at the ends for connection of the manifold to the liquid heat transfer system of the building on which the panels are used.

Figure 24:
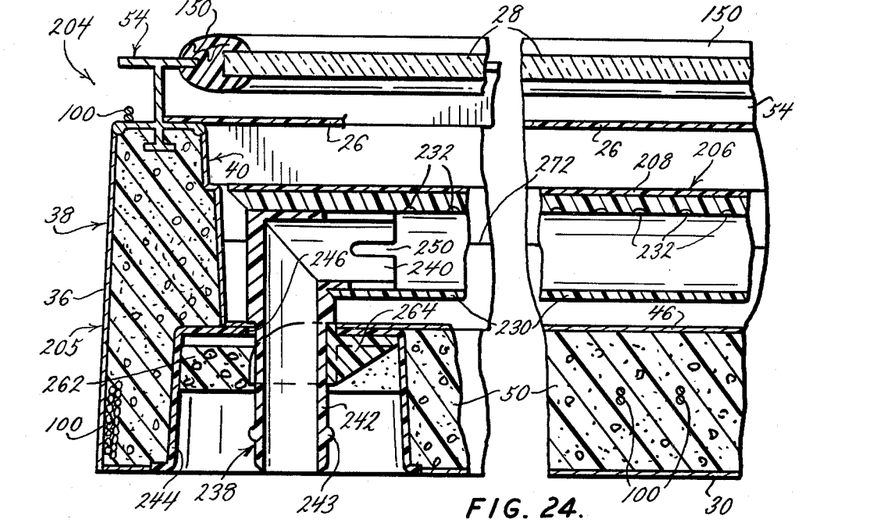
FIG. 24 is a view in section taken generally along the line 24—24 of FIG. 23.

The connectors 238 are elliptical in cross section and L-shaped as shown in FIG. 24 having a portion 240 inserted into the end of the manifold 230, and another portion 242 extending downwardly therefrom and through an opening in the base assembly 205. The lower portion 242 has a bead 243 for connection of a tube or hose as is conventional. The opening in the base 205 through which the L-shaped connector extends, is provided by means of a cup 244 which may be of any suitable material such as molded, glass-filled polyterephthallate. The cup is cast in place during the molding of the base 205 in a manner similar to the sleeves 110 and 122 of the air panel. The upper surface of the cup 244 has an opening 246 through which the connector extends.

The manifolds 230 should be of a high temperature, approximately 300° F. (149° C.), low water absorption material. An example is General Electric NORYL 300. It may be either molded or extruded. The connectors 238 may be of the same or of any other suitable non-metallic composition. The portion of the connectors 238 that extend into the manifold is slotted at 250 for ease of insertion into the manifold. A suitable bonding agent is used to bond the connector within the manifold.

Figure 25:
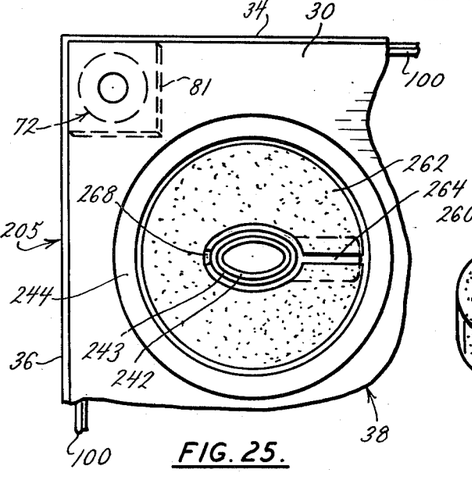
FIG. 25 is a bottom partial view at the corner of the liquid panel.
Figure 26:
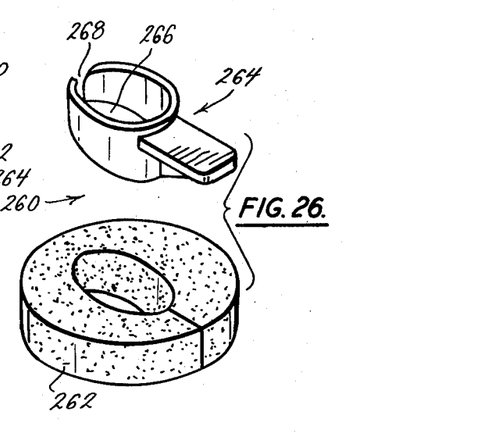
FIG. 26 shows isometric views of the desiccant and holder for the liquid panel.

Surrounding the connectors 238 within the cup 244 are desiccant assemblies 260. This assembly includes a split ring desiccant 262 and a desiccant holder 264. The holder 264 has an elliptical opening 266 that fits over the elliptical connector 238 (FIGS. 24, 25 and 26). The elliptical or oval cross sections of the manifolds, connectors and the holder 264 are to prevent damage of these components should the liquid freeze. The holder is also split at 268 so that it may be slipped over the connector 238 with snug engagement. The desiccant 262 is bonded to the holder with a suitable bonding agent. The holder may be made of any suitable material such as glass-filled polyterephthallate. Just as with the air panel, the purpose of the desiccant 262 is to absorb unwanted moisture.

The ends of the absorber assembly 206 have stiffening flanges 270. The absorber assembly is positioned within the base assembly 205 with the flanges 236 of the manifolds resting on ledges 272 extending along the inside walls of the base. It is secured with a suitable cement.

Fabrication and Assembly of the Liquid Panel

The liquid panel is assembled and fabricated in basically the same way as the air panel except for the absorber.

To produce the absorber 206 a mold or plate (termed hereafter the "casting plate") of cast metal or a stable non-metallic substance of a configuration complementary to (the negative of) the lower sheet 214 is mounted on a suitable support and heated to an appropriate temperature to facilitate the curing of the compounds used for the gel coat 222 and main portion 221 of the sheet. This temperature may be approximately 165° F., (74° C.). The casting plate is made from a master tool of the same configuration as the sheet 214. The master tool can be used to produce additional casting plates as required for additional production.

With the casting plate heated, a suitable parting compound is applied, such as of TEFLON, wax or the like, it being important that all surfaces of the plate are coated. Next the manifold assemblies 230 are placed in appropriate slots along the side edges of the plate preferably with the holes 232 in proper alignment with ridges of the plate that will form the channels 218 adjacent the manifolds. The connectors 238 are inserted in the ends of the manifolds with the majority of the downwardly extending portions 242 masked.

With the manifolds and connectors in place, the liquid impervious material such as an epoxy spray is applied over the entire surface of the plate and partially up the facing sides of the manifolds for the full length of each including the connectors. This spray forms the gel coat 222 which may be approximately 3 to 10 mils (0.08 mm to 0.25 mm) thick.

The epoxy spray is allowed to gel slightly and then the chopper fiberglass and its plastic binder is sprayed over the gel coat to an appropriate thickness which may be approximately 15 to 30 mils (0.38 mm to 0.76 mm). If desired, this second spray coat may be of the same binder resin as the first such that both portions 222 and 221 may be applied in a substantially continuous spraying operation.

After the coating 221 has partially cured, but while still tacky, the foil reflective cover 222 is put in place with relatively light pressure so as not to disturb the relationship of the resin with the ridges and valleys of the casting plate. The foil may be either precut or delivered from a roll and then sheared.

The assembly or sheet 214 is allowed to further cure for several minutes until dimensionally stable and is then removed from the casting plate. It is then set aside and allowed to complete the curing process for several hours after which the parting compound is removed from its upper surface.

The upper sheet 208 is fabricated with the absorptive coating on one side applied in accordance with the processes previously referred to with respect to the air panel, and with its other side covered with the epoxy or other waterproof coating 212 which may be applied by spraying the coating onto the absorber sheet in a conventional manner.

With the upper sheet 208 previously coated on both sides, the sheet is placed on a table with the absorptive surface 210 facing down. The table may be heated to an appropriate temperature to facilitate the setting of the cement to be applied. A thin coat, approximately 0.001 inches (0.025 mm) to 0.004 inches (0.1 mm), of epoxy or other suitable cement is applied over the entire surface 212 of the sheet. The entire surface must be covered evenly and completely with the cement. The sheet 214 is then placed on top of the cement-covered surface of the sheet 208 with the tops of the buttons 215 contacting the cement. One way to accomplish this is to cap three of the connectors 238, seal the mating edges of the sheets 208 and 214 with inflated tubes, and attach a vacuum system to the fourth connector, thus drawing the sheets 208 and 214 together. The vacuum is held until the cement sets sufficiently to hold the sheets firmly together. The vacuum system is then removed and assembly of the absorber 206 is completed.

Operation and Installation Of the Liquid Panel

The operation and installation of the liquid panel is identical to that of the air panel except for the operation of the absorber 206 which uses liquid instead of air. Thus, with the liquid panel, liquid enters one of the manifolds 230 through an appropriate connector 238, passes through the holes 232 and into the liquid channels 218 between the buttons 215 by way of the channel 233. The liquid flows in a substantially uniform fashion from one side of the absorber to the other, thence into the holes 232 of the opposite manifold 230, and out an appropriate connector 238. In making its circuitous path through the channels 218 from one manifold to the other, the liquid absorbs heat transferred to it from the absorptive coated upper sheet 208. The numbers and configurations of the circuitous paths provide superior heat exchange capability and exceptional efficiency, and because the lower sheet 214 is non-metallic, and the upper sheet 208 is coated on the side next to the liquid, the liquid never comes in contact with metal, thus substantially reducing any likelihood of failure of the absorber or contamination of the liquid.

The absorber 206 is designed specifically to minimize damage due to freezing. In the event of freezing of the liquid within the absorber, the elliptical cross sections of the manifolds and connectors, and the diaphragm-like action of the bottoms of the channels 218 accommodate the expansion due to freezing and minimize damage.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

We claim:

1. A solar collector panel including a base assembly, an absorber assembly mounted within the base assembly, and a light transmitting cover above the absorber assembly, the base assembly further comprising inner and outer reflective surfaces, an insulating layer between said surfaces, a peripheral frame structure having portions embedded in the insulating layer, and supports having portions also embedded in the insulating layer and cooperating with the frame to provide mounting supports for mounting the panel on the structure with which it is to be used.

2. The panel of claim 1 wherein the base assembly further comprises roving interconnecting at least some of the supports within the base and embedded in the insulating layer to reinforce the insulating layer.

3. The panel of claim 2 wherein the insulating layer is foam and the inner and outer reflective layers of the base assembly define inner and outer pans and are bonded to the foam layer over substantially the entire surfaces of the pans to become an integral part thereof, the pans having side walls that terminate in an upper peripheral portion, the frame being located at the upper peripheral portion of the base with lower parts of the frame embedded in the foam to become integral therewith, and said roving extending around the perimeter of said base and embedded in the foam near the bottom thereof to become integral therewith.

4. The panel of claim 3 wherein the frame has a first web cooperating with the upper edges of the inner and outer reflective pans to completely enclose the foam layer.

5. The panel of claim 4 wherein said frame has a second web for mounting the cover in sealing engagement with the frame and for sealing adjacent panels.

6. The panel of claim 1 wherein the frame further comprises means for mounting the cover to the base assembly.

7. The panel of claim 6 further comprising a convection barrier between the absorber assembly and the cover, the frame further having means for mounting the convection barrier to the base assembly.

8. The panel of claim 6 wherein said frame further comprises means for connecting adjacent panels together in sealing relation.

9. The panel of claim 1 wherein the absorber assembly has a lower reflective surface facing, and spaced from, the inner reflective surface of the base assembly, and has an upper light-absorptive surface facing the cover.

10. The panel of claim 1 wherein the absorber assembly comprises an air absorber having passages therein for the flow of air therethrough, and wherein said base assembly further comprises means cooperating with the air absorber defining inlet and outlet plenum chambers between the base assembly and the absorber assembly.

11. The panel of claim 10 wherein the air absorber further comprises a generally flat top sheet with a light-absorptive top surface, a corrugated bottom sheet joined to the top sheet with the corrugations defining air passages between the top and bottom sheets, the ends of the passages having openings to allow the flow of air to and from the plenum chambers, and wherein said base assembly further includes a divider extending transversely to the air passages and cooperating with the absorber assembly to define inlet and outlet plenum chambers on either sides of the divider and between the base and absorber assemblies.

12. The panel of claim 1 wherein said absorber assembly comprises a liquid absorber having means defining channels for the flow of liquid therethrough.

13. The panel of claim 12 wherein the base assembly has a ledge formed on the inner wall thereof to which peripheral edges of the absorber assembly are secured.

14. The panel of claim 12 wherein the passages of the liquid absorber are defined between staggered buttons defining circuitous paths through which the liquid flows from one side of the absorber to the other, the bottoms of said channels having flexible convoluted portions.

15. The panel of claim 14 wherein the buttons are in a pattern of alternately staggered rows and extend substantially over the entire liquid absorber.

16. The panel of claim 14 wherein said liquid absorber further comprises a generally flat top sheet having an upper light-absorptive surface, a bottom sheet with the buttons on the upper surface thereof, the top and bottom sheets being joined at the tops of the buttons to define the channels therebetween, and inlet and outlet manifolds at opposite sides of the absorber assembly each having openings to distribute liquid to and receive liquid from the channels.

17. The panel of claim 14 wherein the lower surface of the liquid absorber is a reflective surface facing, and spaced from, the inner reflective surface of the base assembly.

18. The panel of claim 1 further comprising a desiccant assembly mounted within the panel to absorb moisture.

19. A solar collector panel having a base assembly, an absorber assembly mounted within the base assembly and having an upper light-absorptive surface, and a light transmitting cover secured in sealing engagement with the base assembly to define an enclosure, the base assembly further comprising an inner pan of reflective material having bottom and side walls, an outer pan of reflective material having a bottom and side walls, the inner and outer pans being in spaced apart relation, a peripheral frame having a web cooperating with the upper edges of the inner and outer reflective pans to completely enclose the space between the pans, a foam layer completely filling the space defined between the pans and by the first web of the frame, the foam being bonded to substantially the entire inner surfaces of the inner and outer pans and the web of the frame and the frame having portions extending into the foam and embedded therein to become integral therewith, mounting sleeves spaced about the periphery of the base assembly, the upper ends of the sleeves being attached to the frame with the sleeves extending downwardly therefrom within the side walls of the foam layer, the lower portions of the sleeves extending through the foam being embedded therein to become integral therewith, and roving extending around the sleeves and peripherally within the base assembly, the roving being embedded in the foam to become integral therewith.

20. The panel of claim 19 wherein the inner and outer reflective pans are metallic foils.

21. The panel of claim 20 wherein the inner and outer reflective foil pans are treated with a surfactant on the inner surfaces thereof for bonding the foam to the foil.

22. The panel of claim 21 wherein the surfactants are coatings of fiber and plastic.

23. The panel of claim 19 wherein the roving is a glass and polyester.

24. The panel of claim 19 wherein the frame is of extruded aluminum and has holes to receive the upper ends of the sleeves.

25. The panel of claim 19 wherein additional roving extends between sleeves and across the base assembly at an intermediate location of the base which roving is also embedded in the foam and integral therewith, and additional roving surrounds the frame.

26. The panel of claim 19 wherein said frame further comprises a second web having an inner peripheral edge and an outer peripheral edge, and wherein said panel further comprises sealing means for mounting the cover to the inner peripheral edge of the second web in sealing engagement therewith, said outer peripheral edge of the second web defining means for sealingly joining adjacent panels.

27. The panel of claim 19 wherein the base assembly further comprises a peripheral ledge on the inner wall thereof for supporting the absorber assembly thereon.

28. The panel of claim 19 further comprising a convection barrier between the absorber assembly and the cover, the convection barrier secured at its peripheral edge to the frame.

29. A solar liquid collector panel comprising a base assembly having a bottom and side walls, a light transmitting cover attached at its periphery near the top of the side walls of the base assembly in spaced relation to the bottom of the base, the cover and base assembly defining the outer enclosure of the panel, an absorber assembly mounted within the enclosure and located between the bottom of the base and the cover, the absorber assembly having top and bottom sheets, at least one of said sheets having alternately staggered buttons on a surface thereof and the other of said sheets being joined to said buttons to define circuitous channels therebetween through which the liquid flows from one side of the absorber to the other, the top sheet defining the upper boundary of said channels and having an upper light-adsorptive surface facing the light transmitting cover.

30. The panel of claim 29 wherein the buttons are in a pattern of alternately staggered rows and extend substantially over the entire liquid absorber.

31. The panel of claim 29 wherein the patterns, sizing, spacings and configurations of the buttons and channels produce less pressure drop of the liquid flowing in a first direction than in a second direction 90° to the first, per unit length of panel.

32. The panel of claim 29 wherein the channels are less circuitous resulting in less pressure drop in the flow of liquid in a first direction than in a second direction 90° to the first.

33. The panel of claim 29 wherein the bottoms of the channels of the absorber assembly are shaped and flexible to minimize damage from freezing of the liquid.

34. The panel of claim 29 wherein the lower surface of the absorber assembly is a reflective surface facing, and spaced from, the bottom wall of the base assembly.

35. The panel of claim 29 wherein the top sheet of the absorber assembly is generally flat, the bottom sheet having the buttons on the upper surface thereof, the top and bottom sheets being joined at the tops of the buttons, to define the channels therebetween, and inlet and outlet manifolds at opposite sides of the absorber assembly each having openings to distribute liquid to and receive liquid from the channels.

36. The panel of claim 35 wherein the manifolds are of elliptical cross section to minimize damage in the event of freezing of the liquid.

37. The panel of claim 35 further comprising connectors attached to the manifolds and extending through the base assembly for supplying liquid to and from the panels.

38. The panel of claim 29 further comprising a convection barrier secured at its periphery to the walls of the base assembly and located between and in spaced relation from the cover and the absorber assembly.

39. The panel of claim 29 wherein the light-absorptive surface is of the selective type.

40. A liquid absorber assembly for use in a solar liquid collector panel, said absorber assembly comprising: a generally rectangular, relatively thin structure having top and bottom sheets, at least one of said sheets having alternately staggered buttons on a surface thereof and the other of said sheets being joined to said buttons to define circuitous channels therebetween through which the liquid flows from one edge of the absorber to the opposite edge, the top sheet defining the upper boundary of said channels and having an upper light-absorptive surface.

41. The absorber of claim 40 wherein the buttons are in a pattern of alternately staggered rows and extend substantially over the entire absorber.

42. The absorber assembly of claim 40 wherein the bottoms of the channels are convoluted and flexible.

43. The absorber assembly of claim 40 wherein the lower outer surface of the absorber assembly is reflective.

44. The absorber assembly of claim 40, wherein the top sheet is generally flat, the bottom sheet having the buttons on the upper surface thereof, the top and bottom sheets being joined at the tops of the buttons, to define the channels therebetween, and inlet and outlet manifolds at opposite edges of the absorber assembly, each having openings to distribute liquid to and receive liquid from the channels.

45. The absorber assembly of claim 44 wherein the manifolds are of elliptical cross section to minimize damage in the event of freezing of the liquid.

46. The absorber assembly of claim 44 further comprising connectors attached to the manifolds for supplying liquid to and from the assembly.

47. The absorber assembly of claim 40 wherein the light-absorptive surface is of the selective type.

48. The absorber assembly of claim 40 wherein there are approximately 1000 buttons per square foot (1.07 per square centimeter) and the channels defined therebetween are approximately twice as wide as they are deep.

49. The absorber assembly of claim 48 wherein the buttons are of a generally rounded shape when viewed from the top and are approximately 0.285 inches (7.24 millimeters) in diameter.

50. The absorber assembly of claim 49 wherein the channels between the buttons are approximately 0.090 inches (2.29 millimeters) wide and 0.045 inches (1.14 millimeters) deep at the center.

51. A solar liquid collector panel comprising a base assembly having a bottom and side walls, a light transmitting cover attached at its periphery near the top of the side walls of the base assembly in spaced relation to the bottom of the base, the cover and base assembly defining the outer enclosure of the panel, an absorber assembly mounted within the enclosure and located between the bottom of the base and the cover, the absorber assembly further comprising a top sheet, and a bottom sheet with staggered buttons on the upper surface thereof, the top and bottom sheet being joined at the tops of the buttons to define circuitous channels through which liquid flows from one side of the absorber to the other, the top sheet of the absorber assembly being metallic and having a coating on the lower surface to prevent contact of the metal by the liquid flowing through the absorber assembly, the main portion of the bottom sheet including the buttons being nonmetallic, and inlet and outlet manifolds at opposite sides of the absorber assembly each having openings to distribute liquid to and receive liquid from the channels.

52. The panel of claim 51 wherein the top sheet is generally flat and has an upper absorptive surface.

53. The panel of claim 51 wherein the bottom sheet of the absorber assembly is of a chopped fiber and resin composition and the upper surface of which is of a composition impervious to the liquid in contact therewith as the liquid flows through the absorber assembly.

54. The panel of claim 51 further comprising a reflective metallic foil bonded to the lower surface of the lower absorber sheet with the reflective surface of the absorber assembly facing the bottom wall of the base assembly.

55. The panel of claim 51 wherein the manifolds are embedded in the composition of the lower absorber assembly sheet to become integral therewith.

56. A solar liquid collector panel comprising a base assembly with bottom and side walls, the base assembly having inner and outer reflective surfaces extending over substantially the entire base assembly with an insulating layer therebetween, a peripheral frame structure extending around the top of the walls of the base assembly and having portions embedded in the insulating layer of the base assembly to become integral therewith, and supports having portions embedded in the insulating layer and cooperating with the frame to provide mounting supports for mounting the panel to the structure with which it is to be used, a light transmitting cover attached at its periphery in sealing engagement with the frame structure in spaced relation to the bottom of the base, the cover and base assembly defining the outer enclosure of the panel, an absorber assembly mounted within the enclosure and located between the bottom of the base and the cover, the absorber assembly having channels for the flow of liquid therethrough, the channels being defined between staggered buttons defining circuitous channels through which the liquid flows from one side of the absorber to the other, the absorber assembly further having an upper light absorptive surface facing the light transmitting cover.

57. The panel of claim 56 wherein the base further comprises roving interconnecting at least some of the supports within the base and embedded in the insulating layer to reinforce the insulating layer.

58. The panel of claim 56 wherein the inner and outer reflective surfaces of the base assembly are foils and the insulating layer is a foam insulation, the inner and outer foils of the base assembly being bonded to the foam layer over substantially the entire inside surfaces of the inner and outer foils.

59. A liquid absorber assembly for use in a solar liquid collector panel, said absorber assembly comprising: a generally rectangular, relatively thin structure having a top sheet, and a bottom sheet with alternately staggered buttons on the upper surface thereof, the top and bottom sheet being joined at the tops of the buttons to define circuitous channels through which the liquid flows from one edge of the absorber to the opposite edge, the upper sheet being metalic and having a coating on its lower surface to prevent contact of the metal by the liquid flowing through the absorber assembly, the main portion of the bottom sheet including the buttons being nonmetalic, and inlet and outlet manifolds at opposite edges of the absorber assembly, each having openings to distribute liquid to and receive liquid from the channels.

60. The absorber of claim 59 wherein the top sheet is generally flat and has an upper light-absorptive surface.

61. The absorber assembly of claim 59 wherein the bottom sheet of the absorber assembly is of a chopped fiber and resin composition and the upper surface of which is of a composition impervious to the liquid in contact therewith as the liquid flows through the absorber assembly.

62. The absorber assembly of claim 61 further comprising a reflective foil bonded to the lower outside surface of the lower absorber sheet.

63. A liquid absorber assembly for use in a solar liquid collector panel, said absorber assembly comprising: a generally rectangular, relatively thin structure having a generally flat top sheet having an upper light-absorptive surface, a bottom sheet with alternately staggered buttons on the upper surface thereof, the top and bottom sheets being joined at the tops of the buttons to define circuitous channels through which the liquid flows from one edge of the absorber to the opposite edge, and inlet and outlet manifolds at opposite edges of the absorber assembly, said manifolds having openings to distribute liquid to and receive liquid from the channels, and at least a portion of said manifolds being embedded in the composition of the lower absorber assembly sheet to become integral therewith.

* * * * *